Oct. 1, 1957    C. E. KILLEBREW    2,808,017
POSITION INDICATOR
Filed May 3, 1954    5 Sheets-Sheet 1
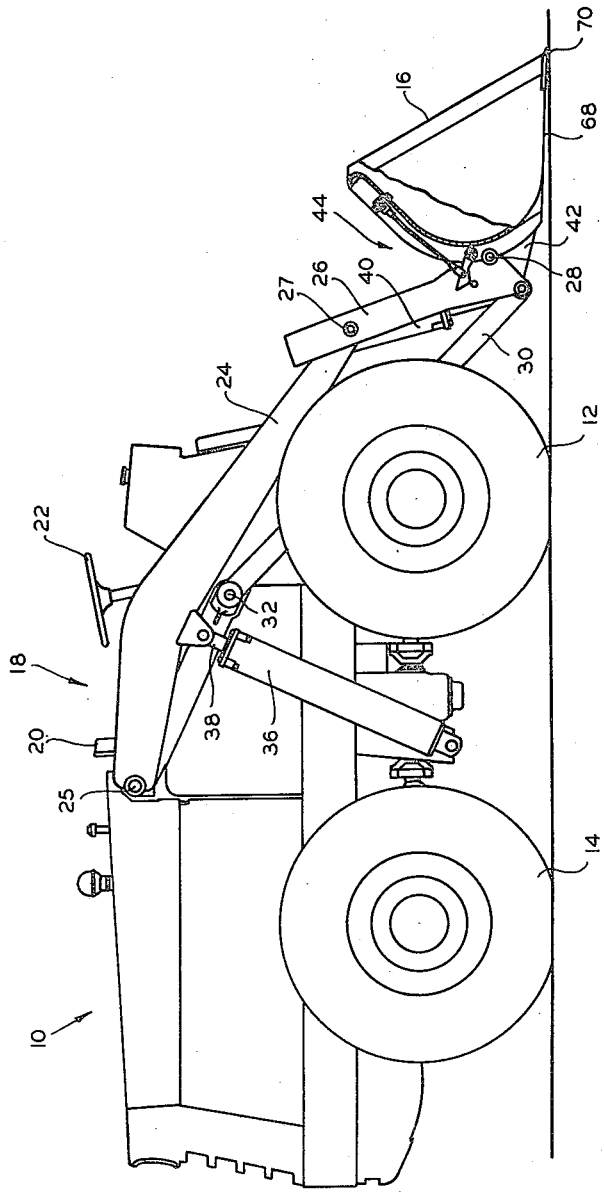
INVENTOR.
CLARENCE E. KILLEBREW
BY J. Frederick Bechtel
ATTY.

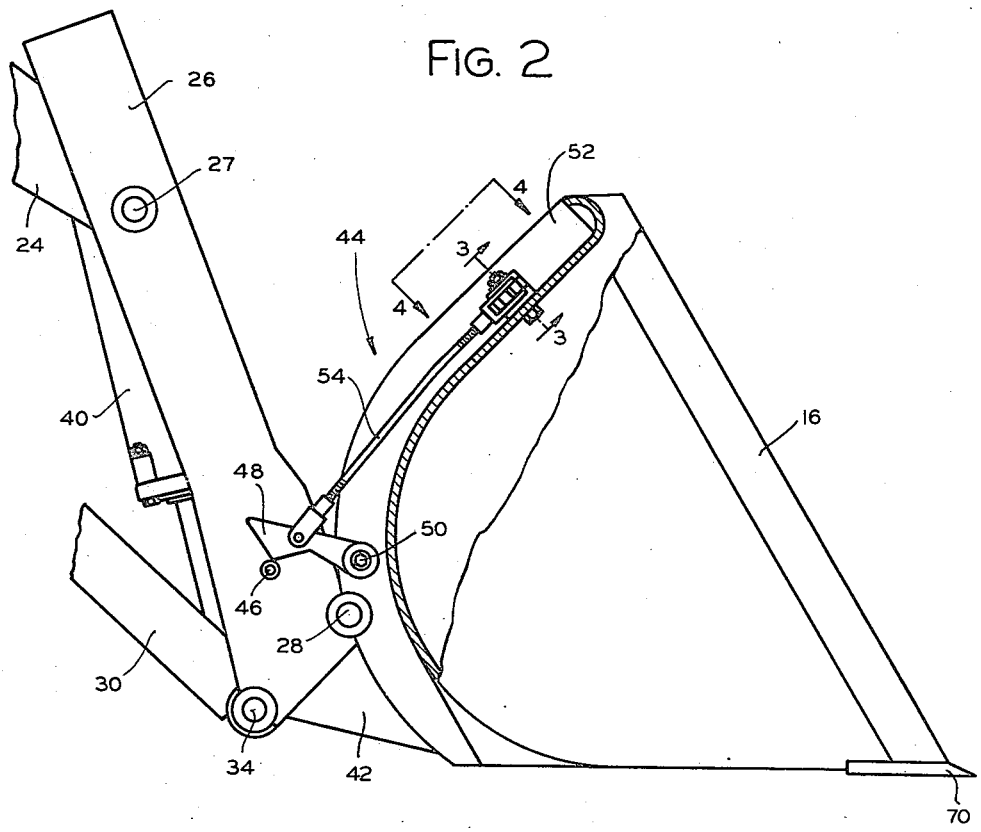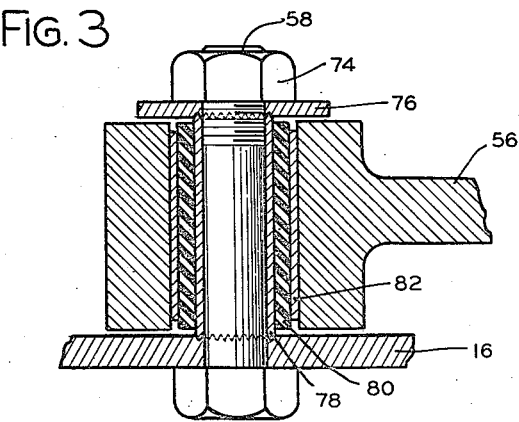

Oct. 1, 1957
C. E. KILLEBREW
2,808,017
POSITION INDICATOR
Filed May 3, 1954
5 Sheets-Sheet 3
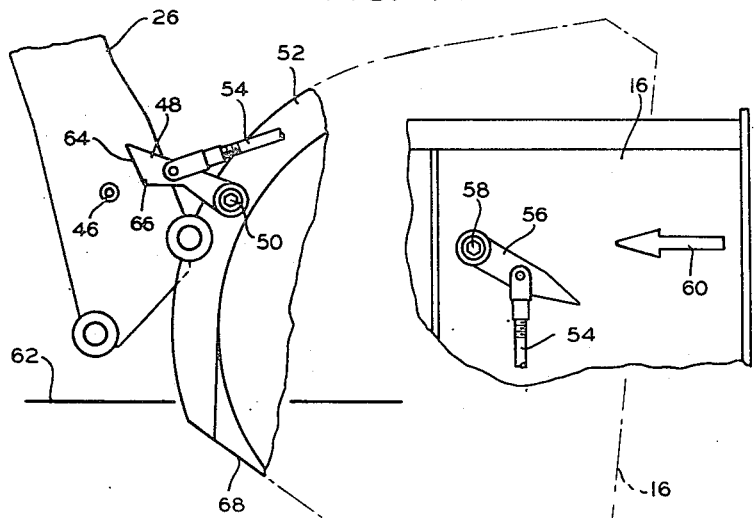
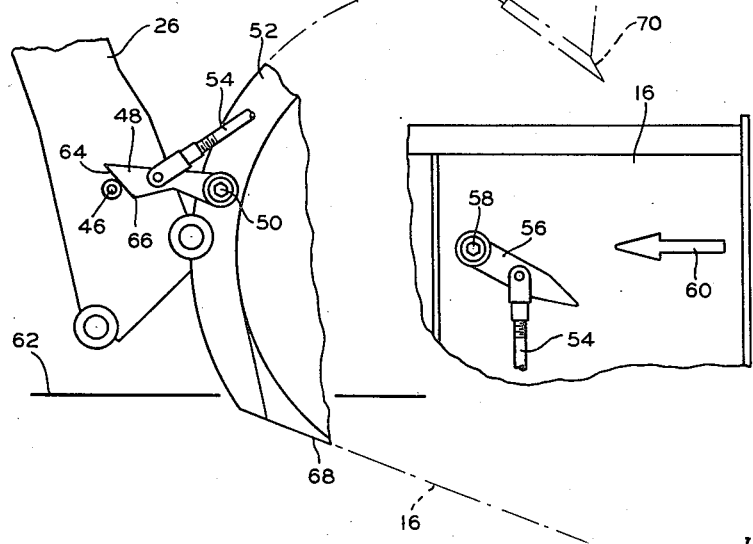
INVENTOR.
CLARENCE E. KILLEBREW
BY J. Frederick Bechtel
ATTY.

Oct. 1, 1957  C. E. KILLEBREW  2,808,017
POSITION INDICATOR

Filed May 3, 1954  5 Sheets-Sheet 4

INVENTOR.
CLARENCE E. KILLEBREW
BY
J. Frederic Bechtel
ATTY.

Oct. 1, 1957

C. E. KILLEBREW 2,808,017

POSITION INDICATOR

Filed May 3, 1954

INVENTOR.
CLARENCE E. KILLEBREW
BY
ATTY.

United States Patent Office 2,808,017
Patented Oct. 1, 1957

2,808,017

POSITION INDICATOR

Clarence E. Killebrew, Benton Harbor, Mich., assignor to Clark Equipment Company, a corporation of Michigan Application May 3, 1954, Serial No. 427,143

9 Claims. (Cl. 116—124)

This invention relates to position indicators for machines such as tractor shovels which have a pivotable load handling member.

In a tractor shovel or other similar machine, the operator ordinarily is located on the upper part of the machine. From this location he operates the vehicle and controls the operation of a scoop member which is arranged to assume various positions such as digging, carrying and dumping. The scoop member is elevatable with respect to the vehicle, and the scoop member is pivoted on the elevating means and arranged to be moved by the operator to its various operating positions by remote control.

Tractor shovels are used frequently for loading bulk material, digging earth and the like. Taking an earth digging operation as an example, it is desired first of all to obtain a scoop full of earth. To accomplish this the scoop is lowered to ground level and is pivoted to digging position. Then the machine is driven forward and the scoop digs a scoop of earth.

In such an operation the pivotal position of the scoop when digging is very important. If the front or cutting edge of the scoop goes downwardly at too great an angle the scoop will dig in too much and an uneven surface will result. If the cutting edge is positioned at some angle above the correct digging position the scoop will not dig in enough. Thus it is important to be able to control accurately the digging position of the scoop.

Various arrangements have been tried heretofore for controlling or indicating the scoop position but to the best of my knowledge none has met with much success. Frequently the scoop is positioned merely by the observation of the scoop by the operator, but since the cutting edge of the scoop ordinarily is on the front of the scoop in a location which the operator can not see he has to guess at the position of the cutting edge by observation of the rear of the scoop. Such an arrangement frequently is inadequate, even with a skilled operator.

It is the principal object of the present invention to provide a position indicating mechanism for a tractor shovel which will permit accurate control of the scoop position.

A further object is to provide a simple and inexpensive mechanism of this character which is, at the same time, durable and not susceptible to damage.

In carrying out my invention in one form I provide a cam operating member located on the elevating mechanism on which the scoop is pivoted. The scoop carries a pivoted cam follower member which is arranged to engage the cam operating member at certain positions of the scoop. A pivoted indicator member mounted on the scoop is operated by the cam follower. The indicator member cooperates with index means located on the scoop, both the indicator member and the index means being in the view of the operator.

For a clearer and more complete understanding of my invention reference should be had to the accompanying drawing illustrating certain preferred embodiments of the invention.

In the drawing:

Fig. 1 is a side elevational view of a typical tractor shovel incorporating my invention.

Fig. 2 is an enlarged partial view, partially in section, showing the position indicator in greater detail, Fig. 3 is a sectional view along 3—3 in Fig. 2, Figs. 4–7 inclusive illustrate various positions of the position indicator.

Figure 6:
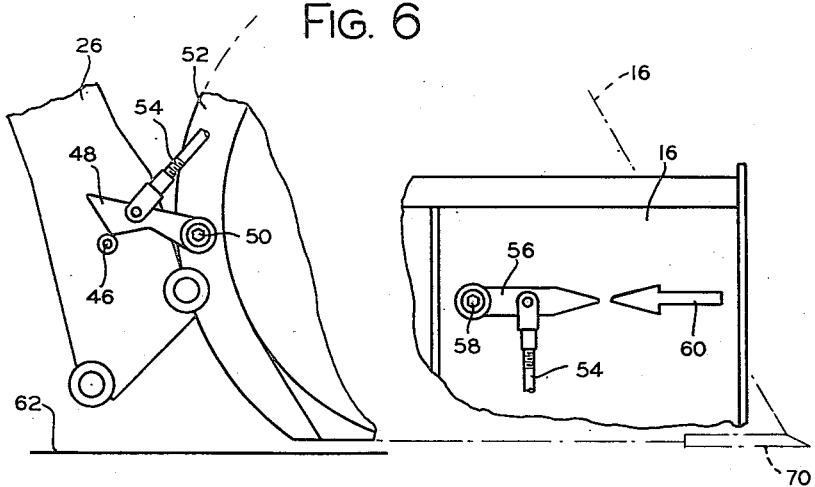

Referring to the drawing, the numeral 10 indicates generally in Fig. 1 a tractor shovel or a front end loader or bulk loader as machines of this type are frequently called. The machine 10 includes and is supported upon a pair of front wheels 12 only one of which appears in Fig. 1, and a pair of rear wheels 14 only one of which is visible in Fig. 1. The vehicle 10 includes an engine for propelling the vehicle and for providing power for performing operations with a scoop 16 located at the front of the machine. The vehicle 10 also includes an operator's station indicated generally at 18, including a seat 20 and an operator's steering wheel 22, where the operator is located when operating the machine. Also located at the operator's station but not appearing in Fig. 1 are the necessary levers and other control devices for operating the vehicle 10 in forward and reverse and for operating the scoop 16 in the various ways to be described hereinbelow.

In the machine 10 illustrated in Fig. 1, the rear wheels 14 are dirigible and all four wheels are connected with the engine for driving operation by the engine in order to provide the maximum amount of tractive effort. It will be understood, however, by those familiar with machines of this type that either the front wheels or the rear wheels or both may be driving wheels as desired. Similarly either the front or the rear wheels or both may be dirigible wheels.

The scoop member 16 is carried by the vehicle 10 by means of a boom structure which includes a pair of boom members 24. Only one of these boom members appears in Fig. 1, but it should be understood that there is another duplicate boom member on the opposite side of the machine. The boom members 24 are pivotally connected to the body of the vehicle at 25 and are pivotally connected to and support a yoke member 26 at 27. The scoop member 16 is pivoted at a pair of locations 28 (only one of which appears in the drawing) on the yoke member 26. A pair of stabilizing arm members 30 are also connected between the body of the vehicle and yoke 26. The stabilizing arms 30 are pivoted at 32 on the body of the vehicle 10 and at 34 on the yoke. The four pivot points 25, 27, 32 and 34 form a configuration which is approximately that of a parallelogram. As a result of this configuration, when the boom members 24 are raised and lowered, the yoke 26 maintains approximately a constant position relative to horizontal regardless of its elevation.

The boom arms 24 are raised and lowered by means of a pair of hydraulic piston and cylinder assemblies 36 in the machine described and illustrated herein, there being one of these assemblies on each side of the machine. When hydraulic fluid is admitted to the bottom of the cylinders 36 as a result of the actuation of a control valve by the operator the piston rods 38 connected to the pistons (not visible) inside the assemblies 36 are extended, causing the booms 24 to rise. When hydraulic fluid is bled from the lower end of assemblies 36 again the booms are lowered.

The scoop 16 is moved pivotally with respect to yoke 26 by means of a pair of hydraulic cylinder and piston assemblies 40 in the typical machine illustrated and described herein, although some machines have only a single assembly for this purpose. The assemblies 40 are connected between the upper portion of yoke 26 and crank arm members 42 which extend rearwardly from scoop 16.

When fluid is admitted to the upper portions of assemblies 40 the crank arms are pivoted downwardly or counterclockwise, as seen in Fig. 1, about pivot point 28 causing the scoop 16 to pivot upwardly. Conversely, when fluid is admitted to the lower portion of assemblies 40 and bled from the upper portions, the scoop member 16 is pivoted downwardly or clockwise as it appears in Fig. 1 and also in Fig. 2 and Figs. 4–7.

The position indicator of my invention is indicated generally by the numeral 44 in Figs. 1 and 2 of the drawing. The position indicator is illustrated in greater detail in Figs. 2–7 inclusive.

The position indicator 44 comprises a pin 46 or other equivalent cam operating member projecting from the side of the yoke member 26. The cam member 46 is engaged at certain positions of scoop 16 by a cam follower member 48 which is pivotally mounted at 50 on a brace member 52 which projects rearwardly from the scoop 16. As illustrated the cam follower member 48 is mounted on brace member 52 which is also the member by means of which the scoop is pivotally mounted to the yoke 26; however, it will be understood that any other projecting portion of the scoop 16 may be utilized if desired.

The cam follower 48 is connected by means of a rod 54 to an indicator member 56 which is pivotally mounted at 58 on the rear surface of scoop member 16. An index mark 60 or a plurality of marks, if desired, may be located on the rear surface of scoop member 16 in any conventional manner to coact with indicator member 56 in indicating the position of scoop 16.

Figures 4–7 inclusive each is composed of two partial views. The left hand view in each of these figures is a partial side elevation view of the lower portion of the position indicator while the right hand view in each of these figures is a partial view of the upper portion of the position indicator looking toward the rear of the scoop 16 along the line 4—4 in Fig. 2. In these figures the two views are from different locations but it will be understood that the rod 54 in the left view actually is connected to the rod 54 in the right view.

Also, in Figures 4–7 a ground line 62 is shown in order to facilitate an understanding of the different angular positions of the scoop 16 in these figures. The ground line 62 is in the same position in all figures with relation to the yoke 26. Therefore it will be readily apparent that the scoop 16 pivots through a considerable angle with respect to yoke 26. A portion of the scoop 16 has been shown in phantom in each of those figures to facilitate an understanding of the pivotal position of the scoop, in the various figures.

It will be understood that the scoop 16 does not actually go below the ground line as illustrated in Figures 4 and 5 except when the tractor shovel 10 is driven forwardly to perform a digging operation with the scoop at an angle as illustrated in one of these figures. In such a case the scoop will dig into the earth at whatever angle the scoop may be. In many cases the scoop is positioned as illustrated in Figure 6 for digging with the bottom approximately horizontal. However, it will be understood that the bottom of the scoop may be positioned at any desired angle.

Another well known use for a machine of this type is to position the scoop 16 at approximately the angle shown in Figure 4 but with the leading edge 70 of the scoop at ground level. The machine 10 may then be used for leveling the surface of the ground merely by driving it forwardly; or with the scoop in this position the machine may be used for filling ditches and the like by scraping piles of earth into the ditch. It will be readily understood by those familiar with machines of this type that they are adaptable for a wide variety of uses of which those mentioned herein are merely illustrative.

In order to facilitate an understanding of the operation of my position indicator, assume that the machine 10 is to be used for obtaining a scoop full of earth by driving the machine forwardly with the scoop in the position shown in Figure 6 and then that the scoop is to be raised by raising the boom arms 24 and the earth dumped into a truck or other similar place.

The operation of my position indicator will now be described starting from the elevated dumping position just referred to. After the scoop has been dumped and is in its extreme clockwise position as shown in Figure 4, the so-called tilt assemblies 40 are actuated to move the scoop counter-clockwise. As the scoop 16 moves counter-clockwise toward the horizontal digging position which is illustrated in Figures 1, 2 and 6 of the drawings, the scoop reaches a position at which the cam follower 48 engages cam operator 46. This initial engagement, which occurs on the left hand slope 64 of a downwardly projecting peak portion 66 of the cam follower, is illustrated in Fig. 5.

As counter-clockwise motion of scoop 16 is continued the cam follower 48 slides on cam member 46 along surface 64 until the crest or apex of projection 66 is reached at approximately the digging position of scoop 16. In this digging position the lower surface 68 of scoop 16 is approximately horizontal and parallel to the ground or other surface on which the tractor shovel is resting. Such surface is indicated at 62. When the scoop is in this digging position and the boom arms 24 are lowered so that the scoop 16 is adjacent the ground, the vehicle 10 may be driven forward to load the scoop. When this is done the cutting edge 70 of the scoop 16 will dig into whatever material is in front of it in approximately a horizontal direction and make a smooth approximately horizontal cut, at the same time filling the scoop 16 with earth or other material which is to be handled.

When the cam follower member 48 is in the position shown in Figures 4 and 5 of the drawing the position indicator member 56 is below the level of the index mark 60, as shown in the right hand views of these two figures. When the apex of peak 66 on the cam operator 46 is reached, however, the cam follower member 48, by means of the rod 54, has pushed the cam indicator member 56 up to an approximately horizontal position at which it is directly opposite the index member 60. This position, illustrated in Figure 6, indicates the normal horizontal digging position as mentioned previously.

Figure 7:
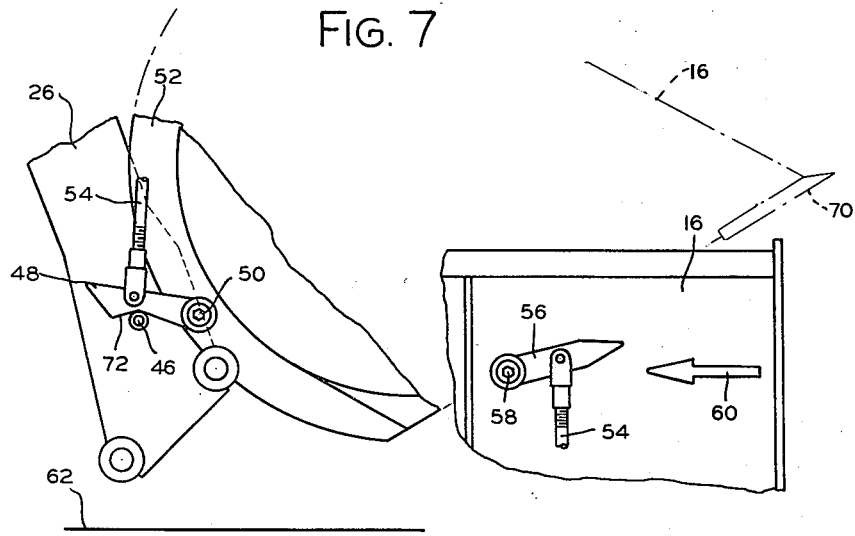

After a load of dirt or other material has been obtained in the scoop 16 by driving the vehicle 10 forwardly, the hydraulic assemblies 40 are operated to pivot the scoop 16 counter-clockwise from the digging position shown in Figure 6 to a carrying position which is illustrated in Figure 7. During this operation the cam follower 48 moves on cam operator 46 along the opposite sloping surface 72 of the peak 66 until it arrives at the position shown in the left hand view of Figure 7. This moves the position indicator 56 above horizontal as illustrated in the right hand view of Figure 7.

After the scoop 16 has been tilted counter-clockwise to a carrying position in this manner the booms 24 are raised a small amount to provide sufficient clearance between the scoop 16 and the surface on which the vehicle 10 is operating. Then the vehicle 10 is driven to the location at which the load in scoop 16 is to be deposited. Thereafter the boom arms 24 are raised to a sufficient height for the contents of scoop 16 to be dumped into the receptacle, truck or the like for which they are destined. The dumping is achieved by operating the hydraulic assemblies 40 in the opposite sense, and when such dumping takes place the cam follower 48 moves on cam operator 46 back along surface 72 past the crest of peak 66, thence along surface 64 after which cam follower 48 leaves cam operator 46 and ultimately assumes the position shown in Figure 4.

Thereafter the tractor shovel 10 may be returned to the digging location and the operation just described repeated.

Figure 3 of the drawing shows a partial sectional view along a plane through the axis of the bolt 58 which connects the indicator member 56 to the scoop 16. The indicator member 56 is connected to the scoop 16 through a resilient bushing so that the indicator member 56 always returns to the lowest position, as shown in Figure 4, when the cam follower member 48 is not in engagement with pin 46. The cam follower member 48 preferably is connected to brace member 52 in a similar manner, so as to cooperate in returning indicator member 56 and cam follower member 48 to their lowermost positions as illustrated in Figure 4 whenever cam follower 48 is not in engagement with cam operator 46. Such a construction urges follower member 48 toward operator 46 and keeps these two parts in engagement whenever the scoop position permits such engagement.

Figure 3 shows a typical resilient bushing construction which is suitable for the connection of both indicator member 56 and cam follower 48 to the scoop 16; however, it will be readily apparent that other types of construction such as metal springs for example could be substituted for this construction without departing from the present invention. In Figure 3 an annular resilient bushing member is shown connecting the indicator member 56 and bolt 58. The annular resilient bushing includes an annular rubber portion 80 having a pair of annular metal portions 78 and 82 located respectively inside and outside the rubber portion and bonded to the rubber portion 80. As illustrated in Figure 3 the outer metal portion 82 is in turn connected to indicator member 56 while the inner metal portion 78 is secured firmly on the surface of scoop 16 by means of a washer 76 and a nut 74 on bolt 58, the nut 74 being utilized to tighten down the washer 76 on member 78 until it is held firmly in position.

From the foregoing it will be apparent that my invention provides a position indicator which may be readily observed by the vehicle operator from his position at 18 in order to indicate to him the position of the cutting edge 70 of the scoop even though he cannot see the cutting edge. It will be understood that he can vary the position of the cutting edge as desired above and below horizontal by watching the indicator member 56 and locating it respectively above or below index mark 60.

The peaked construction of the cam follower member 48 as illustrated and described herein provides maximum travel and therefore maximum accuracy of the position indicator near the digging position. At the same time the reverse slope 72 of the peak portion 66 of the cam follower provides for only a small additional movement of indicator member 56 beyond the digging position even though the scoop 66 tilts through a considerable angle in moving from the digging position of Figure 6 to the carrying position of Figure 7. As illustrated herein the operating rods 54 may be made adjustable to facilitate adjusting the indicator member 56 with respect to the index mark 60. In this typical case the rod 54 is provided with threads of opposite sense at the two ends. That is, with left hand threads at one end and right hand threads at the other. Thus merely turning the rod 54 will accomplish the adjustment in a known manner.

Figure 8:
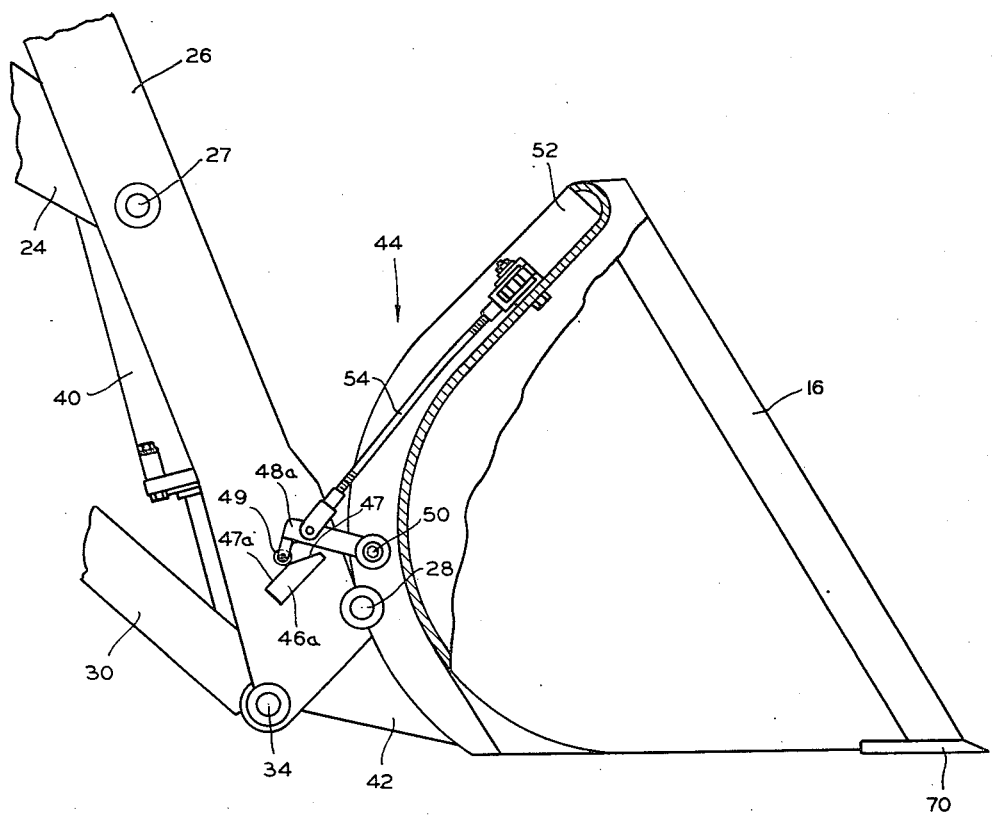
Fig. 8 shows a modified embodiment of the invention.

A modification of my invention is illustrated in Figure 8 of the drawing. In this modification the cam operator which is designated 46a in the drawing is provided with a peaked portion having two sloping surfaces 47 and 47a while the cam follower member which is designated as 48a is equipped with a roller 49 which rolls along the sloping surface 47 and 47a of the cam follower 46a. It will be understood that with this arrangement the same action of indicator member 56 as in the other modification of the invention may be obtained by providing the cam follower member 46a with suitable sloping surfaces, or any other desired action of the indicator member 56 may be secured by providing cam operating member 46 with suitable nonplanar cam surfaces.

My construction provides a position indicator which is simple and inexpensive to manufacture but at the same time is durable, as it must be to withstand the abuse that such a device receives on a machine of this character. Moreover, my position indicator may be readily adjusted or repaired by the operator if it should become damaged or bent.

Another feature of my invention is that the position indicator mechanism, except for the cam operator member, is mounted entirely on the scoop and therefore is removable with the scoop without the necessity of breaking any connections with the other parts of the machine. This feature is of considerable value because operators of machines such as these frequently remove the scoop and replace it with fork members or other material handling means for a time. When the scoop is reinstalled on the machine again the position indicating device requires no extra connections and does not require adjustment; it is ready immediately to perform its position indicating operation.

It will be understood that my invention is not limited to the particular vehicle illustrated in the drawing but may be used with other vehicles having similar positioning problems such as fork lift trucks, cranes, snow plows, and the like. It should be understood, therefore, that I intend to cover by the appended claims all modifications which fall within the true spirit and scope of my invention.

What I claim as new and desire to secure by Letters Patent of the United States is:

1. A position indicator for a pivotally mounted member carried remotely by a vehicle at the outer end of a pivotally mounted boom structure, comprising a cam operating member carried by the boom structure, a follower member pivotally mounted on the first named member and arranged to engage the said cam operating member at certain positions of the first named member, and an indicator member pivotally mounted on the first named member and connected for operation by the said follower member.

2. A position indicator for a pivotally mounted material handling member carried remotely by a vehicle at the outer end of a boom structure which is pivotally mounted thereon, comprising a cam operating member carried by the boom structure, a follower member pivotally mounted on the material handling member and arranged to engage the said cam member at certain positions of the material handling member, an indicator member pivotally mounted on the material handling member and connected for operation by the said followed member, and index means on the material handling member arranged to cooperate with the said indicator member.

3. A position indicator for a pivotally mounted load handling member having a predetermined operating range and carried by a vehicle at the outer end of a pivotally mounted boom structure, comprising a cam operating member carried by the boom structure, a cam follower member pivotally mounted on the load handling member and arranged to engage the said cam operating member only during a portion of the operating range of the load handling member, an indicator member pivotally mounted on the load handling member, and means connecting the said follower member to the said indicator member whereby the latter is operated by the follower member.

4. A position indicator for a pivotally mounted scoop member carried remotely by a vehicle at the outer end of a boom structure mounted pivotally thereon, comprising a cam operating member carried by the boom structure, a cam follower member pivotally mounted on the scoop member and arranged to slideably engage the said cam operating member only during a portion of the operating range of the scoop member, an indicator member pivotally mounted on the scoop member, an operating rod connecting the said cam follower member and the said indicator member for the operation of the latter by the former, and index means on the scoop member arranged to coact with the said indicator member to indicate the position of the scoop.

5. A position indicator for a pivotally mounted scoop member carried remotely by a vehicle at the outer end of a pivotally mounted boom structure, comprising a cam operating member carried by the boom structure, a follower member pivotally mounted on the scoop member and arranged to engage the said cam operating member at certain positions of the scoop member, an indicator member pivotally mounted on the scoop member and connected for operation by the said follower member, and resilient means carried by the scoop member for urging the said follower member and the said indicator member toward one extreme of their travel.

6. A position indicator for a pivotally mounted scoop member carried remotely by a vehicle at the outer end of a boom structure pivotally mounted thereon, comprising a cam operating member mounted on the boom structure near the outer end thereof, a cam follower member pivotally mounted on the scoop member and arranged to slideably engage the said cam operating member for a portion of the operating range of the scoop member, resilient means connected between the scoop member and the said cam follower member for urging the latter toward one extreme of its travel, an indicator member pivotally mounted on the scoop member, second resilient means connected between the scoop member and the said indicator member for urging the indicator member toward one extreme of its travel, an operating rod connecting the said cam follower member and the said indicator member for operation of the latter by the former, the two said resilient means cooperating in urging the said cam follower member and the said indicator member in the same direction, and index means on the scoop member arranged to coact with the said indicator member to indicate the position of the scoop.

7. A position indicator for a pivotally mounted scoop member carried remotely by a vehicle at the outer end of a pivotally mounted boom structure, comprising a cam operating member carried by the boom structure near the outer end thereof and having a nonplanar surface, a cam follower member pivotally mounted on the scoop member and arranged to engage the said nonplanar surface of the cam operating member for a portion of the operating range of the scoop member, an indicator member pivotally mounted on the scoop member, means connecting the said cam follower member and the said indicator member for the operation of the latter by the former, and index means on the scoop member arranged to cooperate with the said indicator member to indicate the position of the scoop.

8. A scoop position indicator for a tractor shovel having at the front end thereof a scoop member pivotally mounted on a yoke which is carried by elevatable arm members, the position indicator comprising a cam operating member mounted on the yoke, a cam follower member pivotally mounted by means of a resilient bushing on the scoop and arranged to be out of engagement with the said cam operating member in a dumping position of the scoop and in engagement with the cam operating member in other positions of the scoop including a digging position and a carrying position, the said cam follower having an irregular surface arranged for sliding contact with the said cam operating member and the cam follower initially engaging the cam operating member at a first predetermined point on the cam follower as the scoop is moved from dumping toward digging position, the said cam follower sliding along the said cam operating member on the said irregular surface of the cam follower as the scoop continues moving toward digging position and the cam operating member engaging the cam follower member approximately at a second predetermined point thereon when the scoop is in digging position, the said cam follower continuing to slide along the said cam operating member on the said irregular surface of the follower member as the scoop is moved beyond the digging position until the cam operating member engages the cam follower member at a third predetermined point thereon when the scoop is in carrying position, an indicator member pivotally mounted by means of a resilient bushing on the scoop member, an operating rod connecting the said cam follower member and the said indicator member for the operation of the indicator member by the cam follower member, the two said resilient bushings cooperating in urging the said cam follower and the said indicator toward one extreme of their travel, index means on the scoop member arranged to coact with the said indicator member to indicate the position of the scoop member, and the said indicator member and the said index means being located where they may be observed readily by the operator of the tractor shovel.

9. A scoop position indicator for a tractor shovel having at the front end thereof a scoop member pivotally mounted on a yoke carried by elevatable arm members, the position indicator comprising a cam operating member mounted on the yoke, a cam follower pivotally mounted on the scoop and arranged to be out of engagement with the said cam operating member in a dumping position of the scoop and in engagement with the cam operating member in other positions of the scoop including a digging position, the said cam follower having a peaked surface arranged for sliding contact with the said cam operating member and the cam operating member initially engaging the cam follower on one slope of the said peaked surface at a point remote from the apex of the peak as the scoop is moved from dumping toward digging position, the said cam follower sliding along the said cam operating member on the said one slope of the cam follower as the scoop continues moving toward digging position and the cam operating member engaging the cam follower approximately at the said apex thereon when the scoop is at digging position, the said cam follower sliding along the said cam operating member on the other slope of the peak as the scoop is moved beyond the digging position, an indicator member pivotally mounted on the scoop member, an operating rod connecting the said cam follower member and the said indicator member for the operation of the indicator member by the cam follower member, index means on the scoop member arranged to coact with the said indicator member to indicate the position of the scoop member, and the said indicator member and the said index means being located where they may be readily observed by the operator of the tractor shovel.

References Cited in the file of this patent

UNITED STATES PATENTS

| | | |
|---|---|---|
| 1,795,406 | Nash | Mar. 10, 1931 |
| 2,517,582 | Lull | Aug. 8, 1950 |

FOREIGN PATENTS

| | | |
|---|---|---|
| 344,525 | Great Britain | Mar. 9, 1931 |